United States Patent [19]

Mattson

[11] Patent Number: 5,019,318
[45] Date of Patent: May 28, 1991

[54] TIRE MOLD WITH BLADDER PRESSURIZATION SYSTEM

[75] Inventor: William F. Mattson, Hinckley, Ohio

[73] Assignee: The Uniroyal Goodrich Tire Company, Akron, Ohio

[21] Appl. No.: 385,741

[22] Filed: Jul. 27, 1989

[51] Int. Cl.$^5$ .............................................. B29C 35/04
[52] U.S. Cl. ...................... 264/315; 138/44; 264/326; 425/28.1; 425/30; 425/39; 425/812
[58] Field of Search ............... 264/315, 40.3, 326; 425/28.1, 29, 51, 52, 143, 30, 156, 812, 39; 138/44

[56] References Cited

U.S. PATENT DOCUMENTS

| | | | |
|---|---|---|---|
| 1,162,319 | 11/1915 | Southworth | 138/44 |
| 1,559,061 | 10/1925 | Allen et al. | 138/44 |
| 1,586,825 | 6/1926 | Meredith et al. | 138/44 |
| 1,938,475 | 12/1933 | Alexander | 138/44 |
| 2,076,465 | 4/1937 | Kirk | 138/44 |
| 4,436,497 | 3/1984 | Dahl et al. | 425/28 R |
| 4,674,965 | 6/1987 | Hasegawa et al. | 425/143 |
| 4,773,021 | 9/1988 | Harris et al. | 425/143 |
| 4,812,281 | 3/1989 | Beard et al. | 264/315 |

FOREIGN PATENT DOCUMENTS 62-211109 9/1987 Japan .................................. 264/315
62-267107 11/1987 Japan .................................. 264/315

Primary Examiner—Jan H. Silbaugh
Assistant Examiner—Mathieu Vargot
Attorney, Agent, or Firm—Greg Strugalski; Alan A. Csontos

[57] ABSTRACT

A system for curing a green tire made from elastomeric material includes a tire mold with a surface defining a cavity for shaping the tire. A plurality of vent passages communicate the cavity with the exterior of the tire mold. An inflatable bladder presses the tire against the surface defining the cavity for a predetermined time in response to fluid pressurization. A fluid pressure source pressurizes the bladder. A conduit communicates the fluid pressure source with the bladder. A restrictor member is located in the conduit for restricting the rate of increase of fluid pressure in the bladder to a predetermined rate of increase during the first one-third of the predetermined time. During the first one-third of the predetermined cure time, portions of the tire adjacent the plurality of vent passages cure and restrict the flow of other uncured portions of elastomeric material into the vent passages.

1 Claim, 2 Drawing Sheets

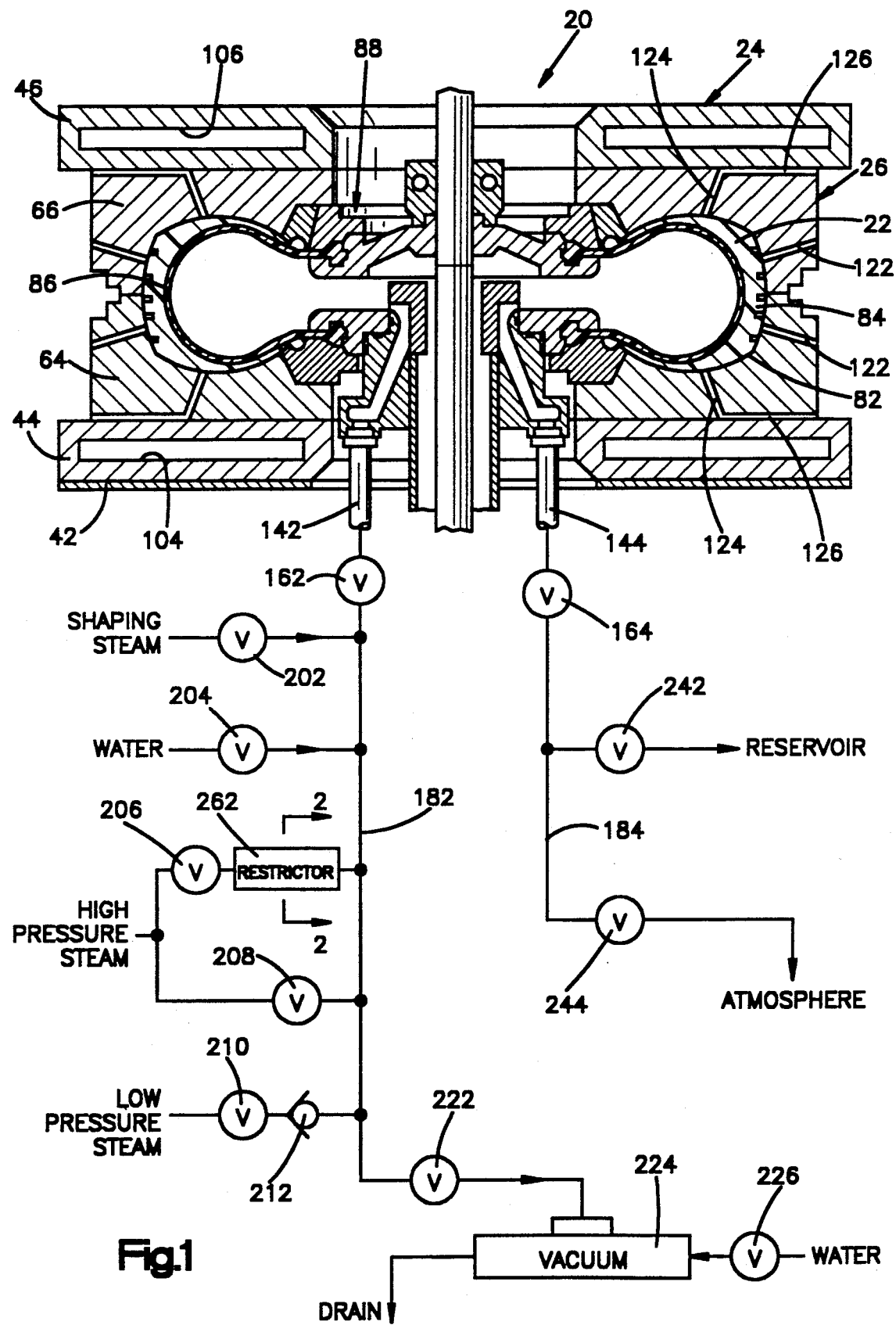

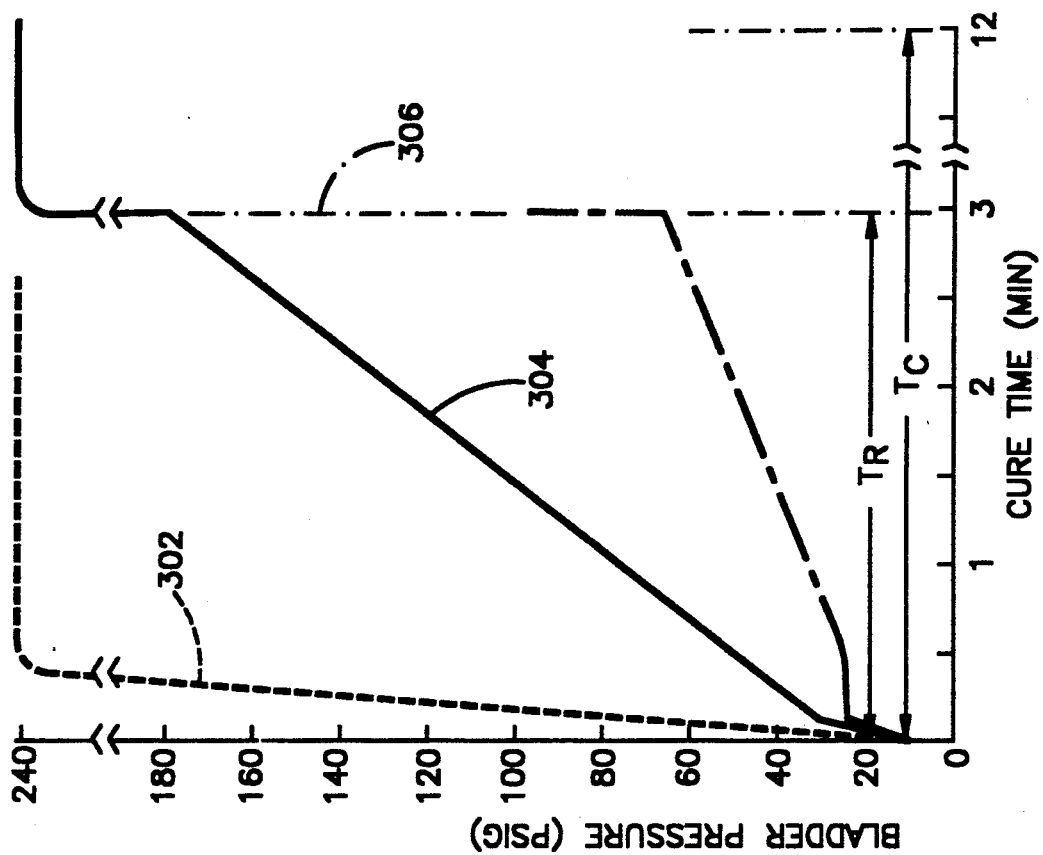
Fig.4
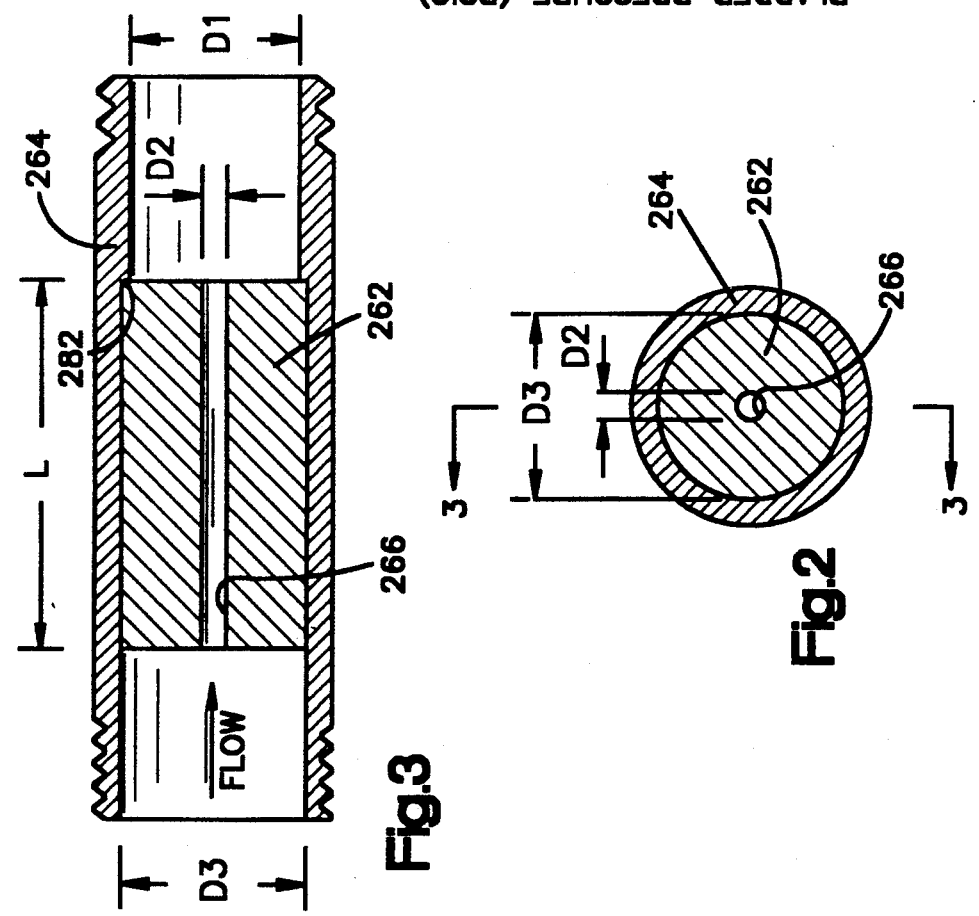
Fig.2
Fig.3

TIRE MOLD WITH BLADDER PRESSURIZATION SYSTEM

BACKGROUND OF THE INVENTION

1. Field of the Invention

The present invention relates to curing an elastomeric article in a mold with vent passages. In particular, the present invention relates to curing a tire so a portion of elastomeric material comprising the tire is restricted from extending into one of the vent passages during the curing operation.

2. Description of the Prior Art

A mold for curing an elastomeric article, such as a tire, typically includes a cavity for shaping the tire. An inflatable bladder is located within the tire and is pressurized to press the tire against a surface of the cavity. A plurality of vent passages communicate the cavity with the exterior of the mold. The vent passages allow fluid to escape from between the tire and the surface defining the cavity. This venting of the cavity enables the tire to contact the largest possible surface area of the cavity for optimal curing.

It is known that uncured elastomeric material comprising the tire is capable of flowing into the vent passages before the elastomeric material cures to a state in which flow is inhibited. When the elastomeric material cures inside of the vent passages, the tire may have many visually unappealing projections which require trimming. Furthermore, cured elastomeric material projecting into a vent passage may tear from the tire at its base and remain in the vent passage after the tire is removed from the mold. The vent passage is blocked from communicating the cavity with the exterior of the mold. The blocked vent passage must then be cleaned before a subsequent curing operation takes place. Cleaning the vent passage is time and labor intensive which adds cost to the production of a tire.

U.S. Pat. No. 4,436,497 addresses the problem of cured elastomeric material remaining in a vent passage in a tire mold. A vent plug is provided which effectively reduces the cross sectional area of the vent passage. This reduces the thickness of the cured elastomeric material projecting from the tire into the vent passage. The vent plug also includes a chamfer located adjacent the cavity. The chamfer increases the strength of the projection near its base to prevent tearing of the projection and remaining in the vent plug. However, nothing limits how far the projection extends into the vent passage.

U.S. Pat. No. 4,812,218 discloses a tire mold having vent passages communicating a cavity with an annular fluid evacuation chamber extending around a tread ring in the mold. The chamber and vent passages are pressurized after a tire is pressed against a surface of the tread ring. Pressurizing the vent passages minimizes the amount of elastomeric material which flows into the vent passages prior to curing. However, pressurizing the vent passages in a traditional, or nonevacuated, tire mold may prove difficult at best.

SUMMARY OF THE INVENTION

The present invention is directed to a system for molding a tire. The system of the present invention does not require pressurizing the vent passages and, thus, is particularly useful with a traditional nonevacuated type of mold.

The system of the present invention is for curing a green tire made from elastomeric material which is capable of flowing prior to curing. The system includes a tire mold having surface means defining a cavity for shaping the tire. A plurality of vent passages communicate the cavity of the mold with the exterior of the mold. In response to pressurization, an inflatable bladder presses the tire against the surface means defining the cavity for a predetermined cure time. A fluid pressure source pressurizes the bladder. Conduit means communicates the fluid pressure source with the bladder. Restrictor means is located in the conduit means for restricting the rate of pressure increase of the bladder to a predetermined rate of pressure increase during the first one-third of the predetermined cure time. The controlled rate of pressure increase allows sufficient time for portions of the tire adjacent the vent passages to cure, thus, restricting the flow of other uncured portions of elastomeric material into the vent passages.

The restrictor means comprises a restrictor member located completely within the conduit means. An opening extends through the restrictor member for a length taken in a direction substantially parallel to the direction of fluid flow through the opening. The length is at least twice the largest dimension of the opening taken in a direction substantially perpendicular to the direction of fluid flow through the opening.

Preferably, the opening in the restrictor member has a generally circular cross section taken in a direction substantially perpendicular to the direction of fluid flow through the opening. The restrictor member controls the pressure increase in the bladder during subsonic flow through the restrictor member according to the formula:

$$\Delta P = fL/d(\rho v^2/2g).$$

Where, $\Delta P$ is the pressure drop across the restrictor member. $f$ is the coefficient of friction between the fluid and the surface defining the opening in the restrictor member. $L$ is the length of the opening. $d$ is the diameter of the opening taken in a direction substantially perpendicular to the length $L$. $\rho$ is the density of the fluid. $v$ is the velocity of the fluid through the opening. $g$ is the gravity constant.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a tire molding system embodying the present invention;

FIG. 2 is a cross sectional view of a restrictor member in FIG. 1, taken approximately along line 2—2 in FIG. 1;

FIG. 3 is a longitudinal cross sectional view of the restrictor member in FIG. 2, taken approximately along line 3—3 in FIG. 2; and FIG. 4 is a graphical representation of pressure in a bladder as a function of time.

DESCRIPTION OF A PREFERRED EMBODIMENT

A tire molding system 20 for curing a "green" tire 22 is illustrated in FIG. 1. The tire molding system 20 includes a press 24 and a mold 26. The press 24 includes a bed 42, a lower platen 44 fixed to the bed and a movable upper platen 46. The mold 26 includes a lower mold half 64 and an upper mold half 66 which are attached to the upper and lower platens 44, 46, respectively. The press 24 also includes a drive mechanism (not shown) for raising, lowering and tilting the upper platen 46 and upper mold half 66.

The mold 26 includes a surface 82 defining a cavity 84 for shaping and curing the tire 22. During operation of the tire molding system 20, the tire 22 is received in the cavity 84. The press 24 is heated by supplying steam to annular chambers 104 and 106 in the platens 44 and 46, respectively. Heat is conducted from the press 24 to the mold 26. The heating is preferably continous to maintain a substantially constant temperature in the mold 26.

An inflatable bladder 86 is attached to a diaphragm assembly 88 at the center of the press 24. The bladder 86 inflates in response to fluid pressurization and forces the tire 22 against the surface 82 defining the cavity 84. Steam and pressure in the bladder 86 and heat in the mold 26 cooperate to cure the elastomeric material comprising the green tire 22 over a predetermined cure time.

A plurality of vent passages 122 extend from the cavity 84 to the exterior of the mold 26. Another plurality of vent passages 124 extend from the cavity 84 to respective channels 126 in the mold halves 64, 66 which communicate with the exterior of the mold 26. It will be apparent that the passages 122, 124 and channels 126 may optionally communicate with a vacuum source.

The tire molding system 20 also includes an inlet conduit 142 and an outlet conduit 144 in communication with the bladder 86. A valve 162 controls the flow of water and steam from an inlet manifold 182 to the inlet conduit 142. A valve 164 controls the flow of water and steam from the outlet conduit 144 to an outlet manifold 184.

A valve 202 controls the flow of 5–15 psig shaping steam to the inlet manifold 182. A valve 204 controls the flow of 300–400 psig heated water to the inlet manifold 182. Valves 206 and 208 control the flow of high pressure (200–300 psig) saturated steam to the inlet manifold 182. A valve 210 controls the flow of low pressure (100–150 psig) steam to the inlet manifold 182. A valve 222 controls fluid flow between the inlet conduit 182 and a vacuum pump 224. The vacuum pump 224 is a venturi-type pump receiving water through a cut-off valve 226.

A valve 242 controls the flow of exhaust water from the outlet manifold 184 to a reservoir. A valve 244 controls the flow of unrecoverable exhaust steam from the outlet manifold 184 to atmosphere. Preferably, all of the valves 202, 204, 206, 208, 210, 222, 226, 242 and 244 are controlled by a computer or programmable controller.

When the tire molding system 20 is operated, all of the valves 162, 164, 202, 204, 206, 208, 210, 222, 226, 242, 244 are closed at the beginning of a cure cycle. The mold halves 64, 66 are open and the green tire 22 is positioned in the lower mold half 64. The valve 162 is opened to admit shaping steam to the bladder 86 to begin to conform the tire to the shape of the cavity 84. The press 24 then closes the mold halves 64, 66 together and locks in the closed position, as illustrated FIG. 1.

The valve 206 is then opened to admit the high pressure steam to the inlet manifold 182 and the inlet conduit 142. After the valve 206 is opened, the high pressure steam passes through a restrictor 262 member. The restrictor member 262 restricts the rate of increase of fluid pressure in the bladder 86 as is explained in detail below. After the lapse of preferably no greater than the first one-third of the cure cycle the valve 208 is opened to provide steam at full pressure. The valves 206 and 208 are then closed. The valve 204 is opened to admit heated high-pressure water to the bladder 86. The bladder 86 is, thus, filled with heated water while maintaining the high internal pressure for the entire cure cycle which lasts a predetermined time.

The valve 208 is then opened to admit high pressure steam to the bladder 86 and the valves 164, 242 are opened simultaneously to expel water from the bladder in a relatively short blowback period of 1 or 2 minutes. The blowback period depends on the size of the tire 22 being cured. Valve 242 is then closed to dead end the steam. Valve 208 is closed and valve 210 is opened to admit low pressure steam to the bladder 86 through a check valve 212. This cools the inner surface of the bladder 86 and permits the residual water in the bladder to boil off. Blowdown is initiated by closing valve 210 and opening valve 244 to release the pressure in the bladder 86 and to vent the pressure within the bladder to the atmosphere. After a natural blowdown period, the valve 244 is closed and the valves 162, 222 and 226 open to apply a vacuum to the inlet manifold 182 and inlet conduit 142. The vacuum effects a rapid loss of pressure in the bladder 86 so the mold 26 can be opened.

Since the elastomeric material comprising the green tire 22 may flow prior to curing, ways must be developed to minimize or eliminate this flow of material into the vent passages 122, 124. In order to restrict the flow of uncured elastomeric material into the vent passages 122, 124, the restrictor member 262 is located in the high pressure steam circuit between the valve 206 and the inlet manifold 182. The restrictor member 262 limits the pressure increase in the bladder 86 to a predetermined rate to permit elastomeric material adjacent the vent passages 122, 124 to cure and block the flow of other uncured portions of the elastomeric material into the passages.

The restrictor member 262 (FIGS. 2 and 3) is located entirely within a conduit pipe 264. The restrictor member 262 is preferably cylindrical and has a length L and an outside diameter D3. An opening 266 with a circular cross section extends coaxially through the restrictor member 262 for the entire length L of the restrictor member.

The conduit pipe 264 is tubular. A shoulder 282 is formed in the conduit pipe 264 by boring the internal diameter D1 of the conduit pipe a slight amount. This enlarges the inside diameter D1 of the conduit pipe 264 to a diameter slightly less than the diameter D3 of the restrictor member 262. The restrictor member 262 is press-fit in the conduit pipe 264 against the shoulder 282. The shoulder 282 is located in a direction downstream, in the flow path of high pressure steam, from the restrictor member 262 to block the restrictor member from moving any further downstream.

The opening 266 in the restrictor member 262 has a generally circular cross section taken in a direction substantially perpendicular to the direction of flow of the fluid through the opening. The opening 266 has a diameter D2. The length L of the opening 266 of the restrictor body 262 and the diameter D2 of the opening are critical. When the valve 206 opens, the high pressure steam passes through the restrictor member 262. The restrictor member 262 controls the rate of increase of the pressure in the bladder 86 over a predetermined time. The predetermined time is preferably less than or equal to approximately the first one-fourth $T_R$ (FIG. 4) of the entire cure cycle $T_C$ of the tire 22. For example, a cure cycle time $T_C$ for a passenger car tire 22 is illustrated as twelve minutes. It will be apparent that the entire cure cycle time $T_C$ and the predetermined time are dependent on various factors such as the materials used, thickness of the tire and size of the tire. For example, for relatively soft tire compounds, the predetermined time may be as large as the first one-third of the cure cycle $T_C$.

In the prior art, when the supply of high pressure steam is opened to the bladder, the pressure develops rapidly as indicated by the leftmost curve 302 of FIG. 4, to a full pressure of at least 200 psig within approximately thirty seconds. The thirty seconds do not give the elastomeric material adjacent the vent passages enough time to cure to a point at which the elastomeric material will not easily flow. The uncured elastomeric material is pushed into the vent passages under the force of 200 psig pressure in the bladder pressing the tire against the mold. After a sufficient amount of time exposed to the elevated temperature of the mold, the portions of the elastomeric material in the vent passages cure and block flow of other portions of the uncured elastomeric material into the passages. However, the elastomeric material projecting from the finished tire may necessitate trimming the tire or the elastomeric material extending into the vent passages may become separated from the tire and remain in the vent passages.

Thus, the restrictor member 262 according to the present invention is provided. The length L and diameter D2 of the opening 266 in the restrictor member 262 are selected to preferably control the rate of pressure increase in the bladder 86 over less than or equal to the first one-fourth $T_R$ of the cure cycle $T_C$. For example, the restrictor member 262 may be sized to restrict the increase in pressure within the bladder 86 according to one of the rightmost curves 304 or 306 illustrated in FIG. 4. The pressure gradually increases over the first one-fourth $T_R$ of the total cure time $T_C$. This allows the elastomeric material adjacent the vent passages 122,124 sufficient time to cure. Curing the portions of the elastomeric material adjacent the vent passages 122,124 while the fluid pressure in the bladder 86 is relatively low, enables the cured material to block the flow of other portions of uncured elastomeric material into the vent passages 122,124 before the pressure within the bladder is high enough to force uncured elastomeric material into the vent passages. Thus, the length of material projecting into the vent passages 122,124 is significantly reduced when compared to no inlet restriction being present during pressurization of the bladder 86 occurred.

The length L of the restrictor member 262 is preferably at least twice the diameter D2 of the opening 266. This is important because the rate of pressure increase downstream of the restrictor member 262 is limited by the friction between the high pressure steam flowing over the inner cylindrical surface of the opening 266. Preferably, the length L of the restrictor member 262 is in the range of 0.75 inch to 1.00 inch. The diameter D2 is preferably in the range of 0.0625 inch to 0.375 inch. The relatively smaller diameter D2 (0.625 inch) of the opening 266 will restrict the flow through the restrictor member 262 and, thus, the rate of pressure increase within the bladder 86 according to the curve 306 (FIG. 4). The relatively larger diameter D2 (0.375 inch) of the opening 266 will restrict the rate of pressure increase within the bladder 86 according to the curve 304.

The opening 266 in the restrictor member 262 controls the pressure increase in the bladder 86 during subsonic flow through the restrictor member, according to the formula:

$$\Delta P = fL/d(\rho v^2/2g).$$

$\Delta P$ is the pressure drop across the restrictor member 262 represented by the difference between the pressure upstream of the restrictor member and the pressure downstream of the restrictor member. It will be apparent that pressure downstream of the restrictor member 262 is substantially equal to the pressure in the bladder 86. f is the coefficient of friction between the fluid and the inner cylindrical surface defining the opening 266 in the restrictor member 262. L is the length of the opening 266. d is the diameter D2 of the opening 266 taken in a direction substantially perpendicular to the length L. $\rho$ is the density of the fluid flowing through the opening 266. v is the velocity of the fluid through the opening 266. g is the gravity constant.

Flow through the restrictor member 262 becomes "choked" when the pressure downstream of the restrictor member cannot increase regardless of the pressure upstream of the restrictor member. Choked flow typically occurs at or above sonic flow through the restrictor member 262. Choked flow is not inherently bad in the tire molding system 20. Choked flow merely provides an upper limit to the rate at which the pressure downstream of the restrictor member 262 and, thus, in the bladder 86 may increase. For example, choked flow occurs along the majority of the length of the inclined portion of the curve 304 or 306. Thus, the inclined portion of the curve 304 or 306 defines the upper limit of the rate of increase of pressure downstream of the restrictor member 262 during the first one-fourth $T_R$ of the total cure time $T_C$.

Including an orifice plate in the conduit pipe 264 is unacceptable because a relatively small orifice opening size is required to adequately restrict the rate of pressure increase in the bladder to a desired rate. The orifice of a sufficient size in the orifice plate does not have sufficient length to control the increase in pressure over just the first one-fourth of the cure cycle. In order to limit the rate of pressure increase in the bladder with an orifice plate to a rate of increase that allows the elastomeric material adjacent the vent passages to cure before the pressure in the bladder forces uncured elastomeric material to flow into the vent passages, a relatively small opening must be used which is prone to clogging by contaminents in the stream. Therefore, the tire molding system 20 of the present invention provides a restrictor member 262 with an opening 266 having a relatively large diameter D2 with a sufficient length L to restrict the increase in fluid pressure in the bladder 86 and not adversely affect total time of the cure cycle or be prone to clogging.

From the above description of the preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An apparatus for curing an article made from a material capable of flowing prior to curing, said apparatus comprising:
   a mold including surface means defining a cavity for shaping the article;
   a vent passage for communicating the cavity with the exterior of said mold to allow fluid to escape from between the article and said surface means defining the cavity;
   means for pressing the article against said surface means defining the cavity for a predetermined curing time in response to fluid pressurization; and
   means for gradually increasing the fluid pressurization of said pressing means from a first pressure to a second pressure greater than the first pressure during an initial period of the predetermined curing time and which initial period is sufficiently long to permit fluid to escape from between the article and said surface means defining the cavity, said means for gradually increasing the fluid pressurization of said pressing means comprising:
   a fluid pressure source;
   a fluid conduit connecting said pressing means with said fluid pressure source; and
   restrictor means comprising a restrictor member located completely within said fluid conduit.

2. The apparatus set forth in claim 1 wherein said initial period is less than one-third of the predetermined curing time.

3. The apparatus set forth in claim 1 wherein said restrictor member includes a bore extending therethrough for a length taken in a direction substantially parallel to the direction of the flow of fluid through the bore, the length of the bore being at least twice the largest cross-sectional dimension of the bore taken in a direction which is substantially perpendicular to the direction of flow of fluid through the bore.

4. The apparatus set forth in claim 3 wherein the bore in said restrictor member has a circular cross-section taken in a direction substantially perpendicular to the direction of the flow of fluid through the bore, said restrictor member controlling the rate of pressure increase in said pressing means during subsonic fluid flow through said restrictor member according to the formula:

$$\Delta P = fL/d(\rho v^2/2g)$$

where $\Delta P$ is the pressure drop across said restrictor member, f is the coefficient of friction between the fluid and the surface defining the bore in said restrictor member, L is the length of the bore, d is the diameter of the bore taken in a direction substantially perpendicular to the length L, $\rho$ is the density of the fluid flowing through the bore, v is the velocity of the fluid through the bore and g is the gravity constant.

5. The apparatus set forth in claim 1 wherein said pressing means comprises an inflatable bladder.

6. An apparatus for curing a green tire made from uncured elastomeric material, said apparatus comprising:
   a mold including surface means defining a cavity for shaping the green tire;
   a plurality of vent passages for communicating the cavity of said mold with the exterior of said mold;
   an inflatable bladder responsive to pressurization for pressing the green tire against said surface means defining the cavity for a predetermined curing time;
   a fluid pressure source for pressurizing said bladder;
   conduit means for communicating said fluid pressure source with said bladder; and
   restrictor means located completely within said conduit means for restricting the rate of increase of pressurization of said bladder to a predetermined rate of increase during the first one-third of the predetermined curing time to cure respective portions of the elastomeric material adjacent said plurality of vent passages and restrict the flow of other portions of the uncured elastomeric material into the vent passages.

7. The apparatus set forth in claim 6 wherein said restrictor means comprises a restrictor member having a bore extending therethrough for a length taken in a direction substantially parallel to the direction of flow of fluid through the bore, the length of the bore being at least twice the largest cross-sectional dimension of the bore taken in a direction substantially perpendicular to the direction of the flow of fluid through the bore.

8. The apparatus set forth in claim 7 wherein the bore in said restrictor member has a circular cross-section taken in a direction substantially perpendicular to the direction of the flow of fluid through the bore, said restrictor member controlling the rate of pressure increase in said bladder during subsonic fluid flow through said restrictor member according to the formula:

$$\Delta P = fl/d(\rho v^2/2g)$$

where $\Delta P$ is the pressure drop across said restrictor member, f is the coefficient of friction between the fluid and the surface defining the bore in said restrictor member, L is the length of the bore, d is the diameter of the bore taken in a direction substantially perpendicular to the length L, $\rho$ is the density of the fluid flowing through the bore, v is the velocity of the fluid through the bore and g is the gravity constant.

9. The apparatus set forth in claim 8 wherein said length of the bore in said restrictor member is at least 0.75 inch and said diameter of the bore in said restrictor member is in the range of 0.0625 inch to 0.375 inch.

10. The apparatus set forth in claim 7 wherein said conduit means comprises a tubular pipe having a circular cross-section of a first inner diameter and said restrictor member comprises a cylindrical exterior surface of a second diameter slightly larger than said first diameter to enable an interference fit between said tubular pipe and said restrictor member.

11. The apparatus set forth in claim 6 where said fluid pressure source supplies fluid pressure of at least 200 psig.

12. The apparatus set forth in claim 6 further including means for communicating said fluid pressure source with said bladder after said first one-third of the predetermined time lapses.

13. A method of curing a green tire made from uncured elastomeric material, said method comprising the steps of:
   providing a mold having a cavity for receiving the green tire and a plurality of vent passages for communicating the cavity with the exterior of the mold;
   placing the green tire in the cavity of the mold;

communicating a bladder located within the mold with a fluid pressure source to press a portion of the green tire against a surface defining the cavity in the mold for a predetermined curing time; and providing a restrictor member located completely within a conduit communicating the fluid pressure source with the bladder to restrict the fluid pressure increase gradually from the fluid pressure source to the bladder over the first one-third of the predetermined curing time to cure portions of the elastomeric material of the green tire adjacent the plurality of vent passages and substantially block the flow of the other uncured portions of the elastomeric material into the plurality of vent passages and in which the restrictor member has a bore with a length taken in a direction substantially parallel to the flow of fluid through the bore and which length is at least twice the largest cross-sectional dimension of the bore taken in a direction substantially perpendicular to the flow of fluid through the bore.

14. A method of curing an article made from material capable of flowing prior to curing, said method comprising the steps of:

providing a mold having a cavity for receiving the article and a vent passage for communicating the cavity with the exterior of the mold;

placing the article in the cavity of the mold;

inflating a bladder to press a portion of the article against a surface defining the cavity of the mold for a predetermined curing time; and providing a restrictor member located completely within a conduit connecting the fluid pressure source and the bladder to restrict the fluid pressure increase in the bladder gradually over the first one-third of the predetermined curing time from a first pressure to a second pressure greater than the first pressure to cure a portion of the material adjacent the vent passage to restrict the flow of another uncured portion of the material into the vent passage and in which the restrictor member has a bore with a length taken in a direction substantially parallel to the flow of fluid through the restrictor member and which length is at least twice the largest cross-sectional dimension of the bore taken in a direction substantially perpendicular to the flow of fluid through the bore.

* * * * *